US008568847B2

(12) United States Patent
Brookshire et al.

(10) Patent No.: US 8,568,847 B2

(45) Date of Patent: Oct. 29, 2013

(54) TWO-SIDED DIRECT THERMAL LABEL WITH POUCH

(75) Inventors: Jody Brookshire, Flowery Branch, GA (US); Erin Conaghan, Johns Creek, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/234,861

(22) Filed: Sep. 16, 2011

(65) Prior Publication Data

US 2013/0068380 A1 Mar. 21, 2013

(51) Int. Cl.
*B32B 7/06* (2006.01)
*B32B 7/12* (2006.01)

(52) U.S. Cl.
USPC .......... 428/40.1; 428/41.8; 428/42.2; 428/43; 428/343; 428/352

(58) Field of Classification Search
USPC ............... 428/40.1, 343, 346, 352, 353, 41.8, 428/42.2, 43, 354
See application file for complete search history.

(56) References Cited

U.S. PATENT DOCUMENTS

| | | | | |
|---|---|---|---|---|
| 5,340,158 | A * | 8/1994 | Bartl | 283/81 |
| 5,686,159 | A * | 11/1997 | Langan | 428/40.1 |
| 6,616,189 | B2 * | 9/2003 | Raming | 283/81 |
| 2007/0211135 | A1 * | 9/2007 | Moreland et al. | 347/221 |

* cited by examiner

*Primary Examiner* — Patricia Nordmeyer

(74) *Attorney, Agent, or Firm* — Robert Chee; Michael Chan

(57) ABSTRACT

A label adapted for direct thermal printing on both sides thereof and having a sealable pouch is described. In one embodiment, the label comprises two substrates, each substrate being coated on an outer face with a thermally sensitive coating. The inner faces of the substrates are respectively coated with an adhesive and a release material. A configuration of die cuts and perforations on the two substrates is provided to allow the label to adhere to a surface such as a package and to form a sealable pouch with respect to said surface.

19 Claims, 7 Drawing Sheets

TWO-SIDED DIRECT THERMAL LABEL WITH POUCH

BACKGROUND OF THE INVENTION

Two-sided direct thermal printing and media adapted therefor are described in U.S. Pat. Nos. 6,759,366; 6,784,906; 7,589,752; and 7,777,770, the contents of which are incorporated herein by reference. In such processes, paper or other media comprising one or more substrates are coated with thermally sensitive material to enable printing thereon. The media is fed through a two-sided thermal printer which selectively heats portions of one or both sides of the media as it is fed through the printer. The thermally sensitive coating on the outside faces of the media darkens or changes color in response to said heating, thus producing text, images, or other information on the respective faces of said media.

SUMMARY OF THE INVENTION

Disclosed herein is a label adapted for direct thermal printing on both sides thereof and adapted for forming a sealable pouch capable of holding paper or other objects. In one embodiment, the label comprises two substrates, each substrate being coated on an outer face with a thermally sensitive coating. The inner faces of the substrates are respectively coated with an adhesive and a release material. A configuration of die cuts and perforations on the two substrates is provided to allow the label to adhere to a surface such as a package and to form a sealable pouch with respect to said surface.

DETAILED DESCRIPTION

Figure 1:
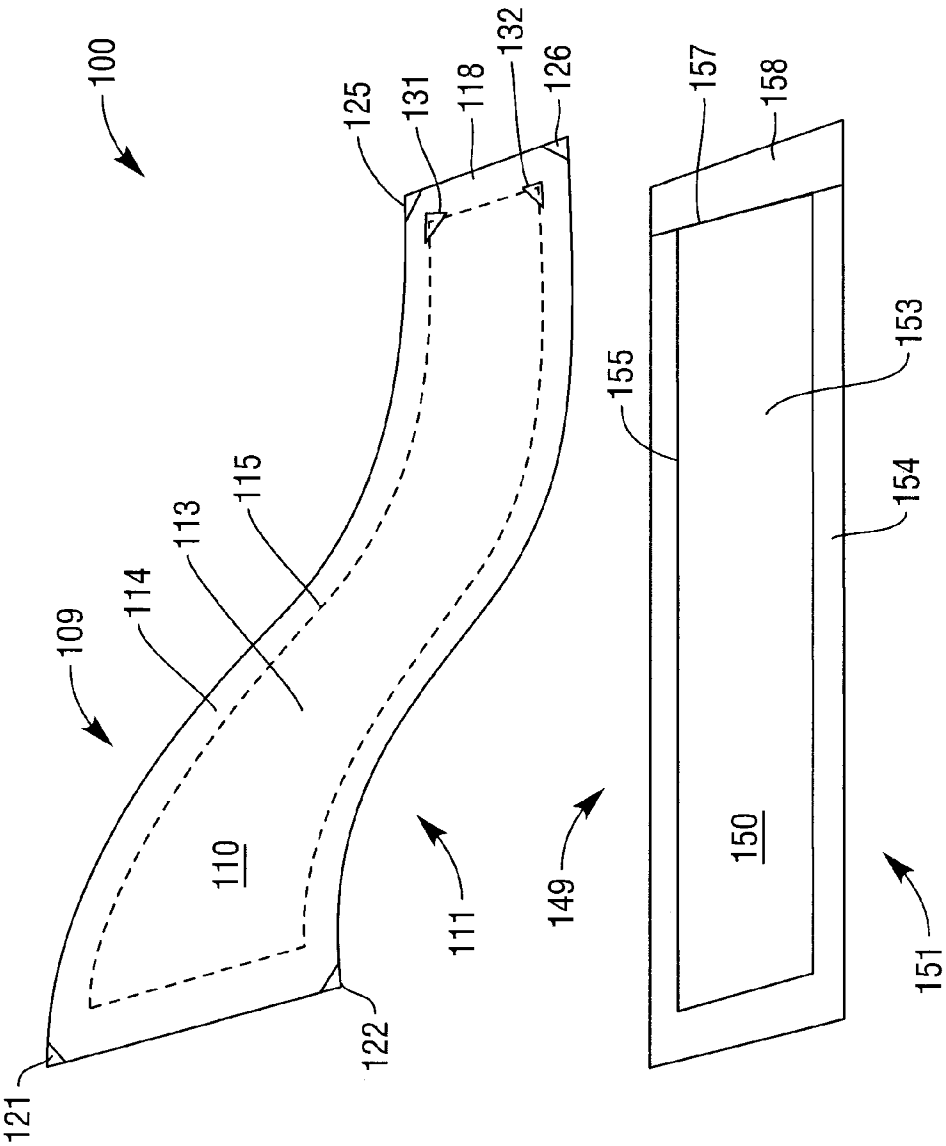
FIG. 1 shows an exploded view of one embodiment of a two-sided direct thermal label.

Referring now to the figures contained herein in which like numerals indicate like elements throughout the several views, FIG. 1 shows an exploded view of a two-sided direct thermal label 100 in a sample embodiment of the invention. Label 100 includes an upper layer 110 and a lower layer 150.

Figure 6:
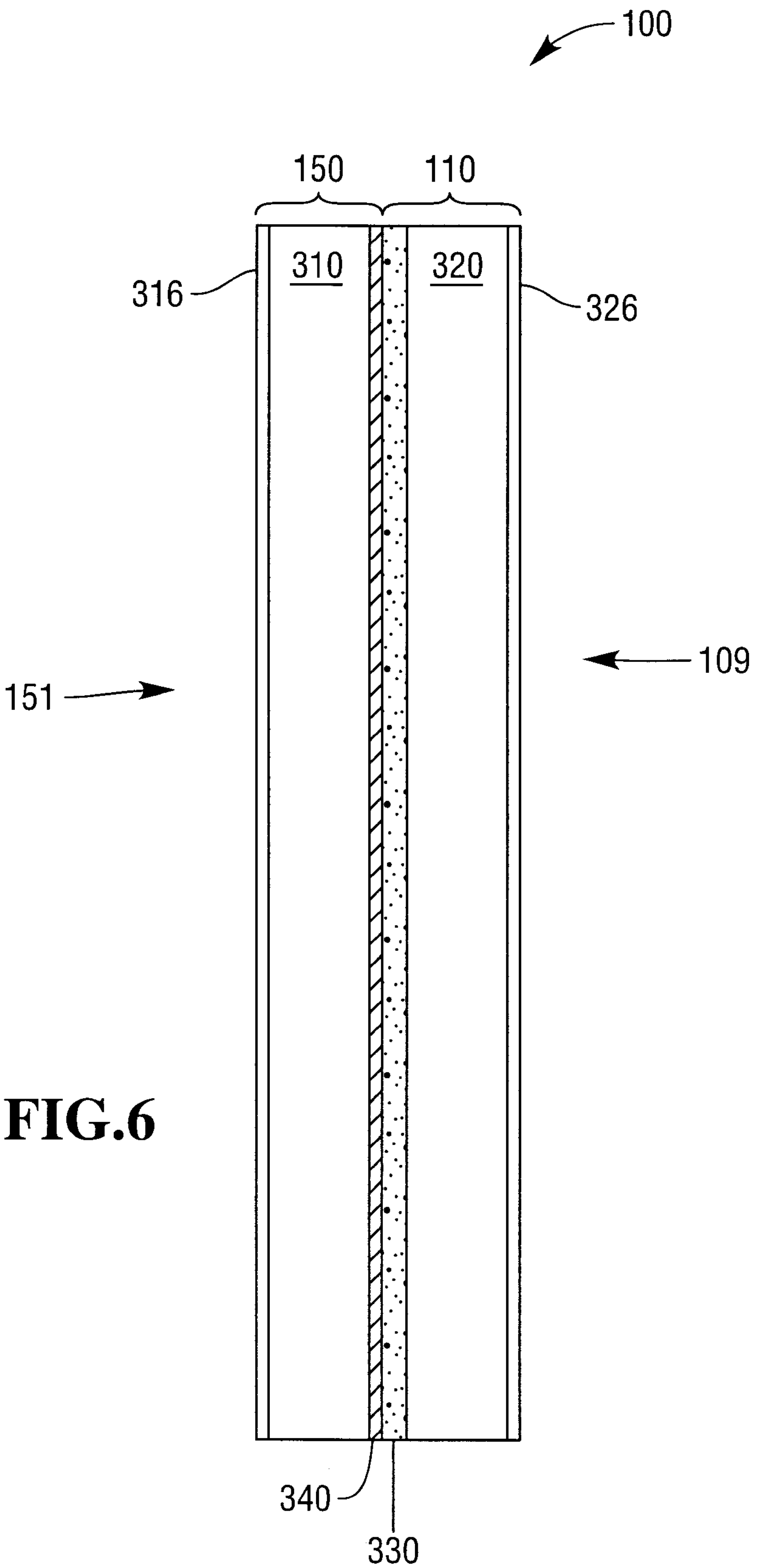
FIG. 6 shows a cross-sectional detailed view of the label of FIG. 1.

Turning to FIG. 6, a cross-sectional detailed view of the label 100 from FIG. 1 is shown. Upper layer 110 preferably comprises a substrate 320 which is coated with a thermally sensitive coating 326 on the outer face 109 of label 100. Substrate 320 preferably comprises a cellulosic material, although other materials can be used such as polymers, particularly polypropylene or polyethylene, which may be in the form of films. Such substrate materials are described more fully in U.S. Pat. Nos. 6,784,906 and 6,759,366, the contents of which are incorporated herein by reference.

Thermally sensitive coating 326 may comprise a heat-sensitive dye or dyes that are capable of changing color or darkening when heated. Such coatings are generally known in the art and are described in U.S. Pat. Nos. 6,784,906 and 6,759,366.

Upper layer 110 also preferably comprises an adhesive 330 on the inner face 111 of substrate 320. Adhesive 330 may comprise a high tack hot melt adhesive and/or a low residual tack adhesive, as known to those skilled in the art.

Lower layer 150 of label 100 preferably comprises a substrate 310, a release layer 340 attached to an inner face 149 of substrate 310, and a thermally sensitive coating 316 on the outer face 151 of substrate 310. Release layer 340 may comprise silicon and/or some other substance suitable for disengaging substrate 310 from adhesive 330 when a pulling force is applied to pull the two substrates 310, 320 apart from one another. Materials suitable for release layer 340 are discussed more fully in U.S. Pat. No. 7,777,770, the contents of which are incorporated herein by reference.

Substrate 310 preferably comprises a cellulosic material or polymeric material similar to substrate 320. Similarly, thermal coating 316 may comprise a heat-sensitive dye or dyes similar to thermal coating 326.

Returning to FIG. 1, upper layer 110 comprises an outer face 109 and an inner face 111. As described above, outer face 109 preferably has a thermally sensitive coating 326 and inner face 111 preferably has an adhesive coating 330.

Upper layer 110 includes a central portion 113 and a peripheral portion 114. Perforation lines 115 separate the central portion 113 from the peripheral portion 114. Advantageously, peripheral portion 114 extends around the entire periphery of upper layer 110. Peripheral portion 114 further comprises an end portion 118. Unlike end portion 158 of lower layer 150 (described more fully below), end portion 118 of upper layer 110 is not severed from peripheral portion 114. Rather, end portion 118 is an integral part of peripheral portion 114. End portion 118 preferably has a shape substantially congruent to, and in vertical alignment with, end portion 158 of lower layer 150.

Pull tabs 131, 132 are optionally included at one end of central portion 113 to facilitate the separation of central portion 113 from peripheral portion 114 as described more fully below. Upper layer 110 also optionally includes pull tabs 121, 122 at one end of label 100 to facilitate the separation of upper layer 110 and the central portion 153 of lower layer 150 from the peripheral portion 154 of lower layer 150 as described more fully below. Finally, upper layer 110 optionally includes pull tabs 125, 126 to facilitate the separation of the end portion 118 of upper layer 110 from the end portion 158 of lower layer 150 as described more fully below.

Upper layer 110 of label 100 is preferably adapted to be processed by a direct thermal printer to allow the printing of text, images, and/or other information on the outer face 109 of upper layer 110. Such thermal printers are described more fully in U.S. Pat. Nos. 7,589,752 and 7,777,770, the contents of which are incorporated herein by reference. Upper layer 110 may also include pre-printed text, images, and/or other information as well as security threads or other security features known to those skilled in the art.

Lower layer 150 comprises an outer face 151 and an inner face 149. As described above, outer face 151 preferably has a thermally sensitive coating 316 and inner face 149 preferably has a release layer 340.

Lower layer 150 preferably includes a first die cut 157 that runs along the entire width of lower layer 150, thus forming an end portion or strip 158 along one edge of lower layer 150. A second die cut 155 preferably is disposed in lower layer 150 such that a peripheral portion 154 is formed in lower layer 150 around the periphery of the lower layer 150. As shown in FIG. 1, the second die cut 155 meets up with the first die cut 157 at two points but does not cut into the end portion 158. The two die cuts 155, 157 effectively create three contiguous regions in lower layer 150: end portion 158, peripheral portion 154, and central portion 153. The two die cuts 155, 157 preferably completely cut through lower layer 150, thus ensuring that the aforementioned three contiguous regions are severed from one another.

Advantageously, the two die cuts 155, 157 in lower layer 150 trace the same outline as the perforation lines 115 in the upper layer 110, thus ensuring that central portion 153 in the lower layer 150 is substantially congruent to—and substantially aligned with—central portion 113 in the upper layer 110. Additionally, the peripheral portion 154 and end portion 158 together are substantially congruent to—and substantially aligned with—peripheral portion 114 of upper layer 110. As described above, the first die cut 157 continues to the edges of lower layer 150 to completely sever end portion 158 from peripheral portion 154. The peripheral portion 154 and end portion 158 of the lower layer 150 collectively form a label backing for label 100, with peripheral portion 154 forming a first (partial) backing and end portion 158 forming a second (partial) backing.

Lower layer 150 is preferably adapted for use in a direct thermal printer to allow the printing of text, images, and/or other information on the outer face 151 of lower layer 150. Lower layer 150 may also include pre-printed text, images, and/or other information as well as security threads or other security features known to those skilled in the art.

Figure 2A:
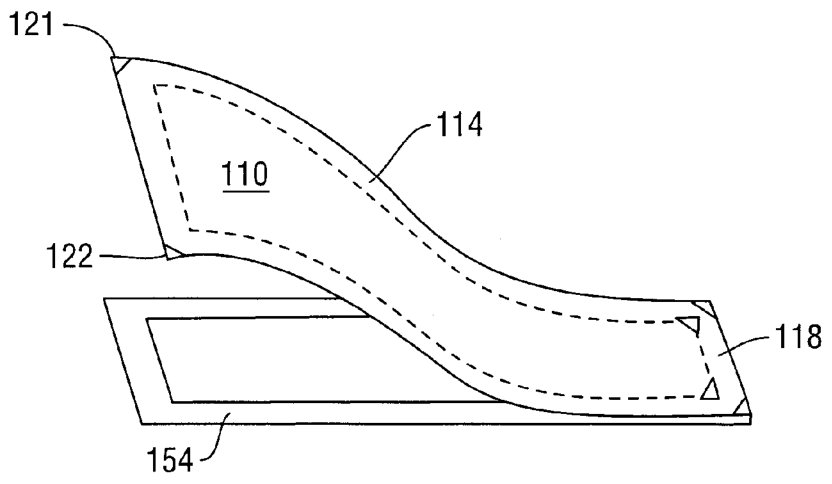
FIG. 2A shows a perspective view of the label of FIG. 1 partially removed from the label backing.
Figure 2B:
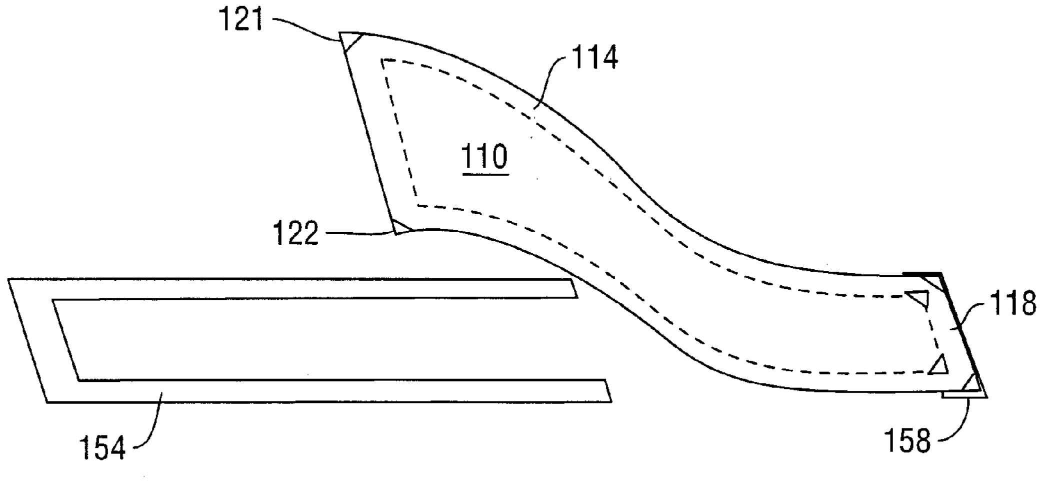
FIG. 2B shows a perspective view of the label of FIG. 1 completely removed from the label backing.

FIGS. 2A and 2B show how peripheral portion 154 of the lower layer 150 may be peeled away from label 100 to expose the adhesive on the underside (i.e., inner face) of peripheral portion 114 (FIG. 3A) of the upper layer 110 of label 100. Optional pull tabs 121, 122 may be used to peel away the label 100 from the peripheral portion 154 of lower layer 150. Advantageously, the release layer 340 (FIG. 6) on the inner face 149 of lower layer 150 allows for the peripheral portion 154 to be peeled away from label 100. After removal, peripheral portion 154 of lower layer 150 may be discarded.

Figure 3B:
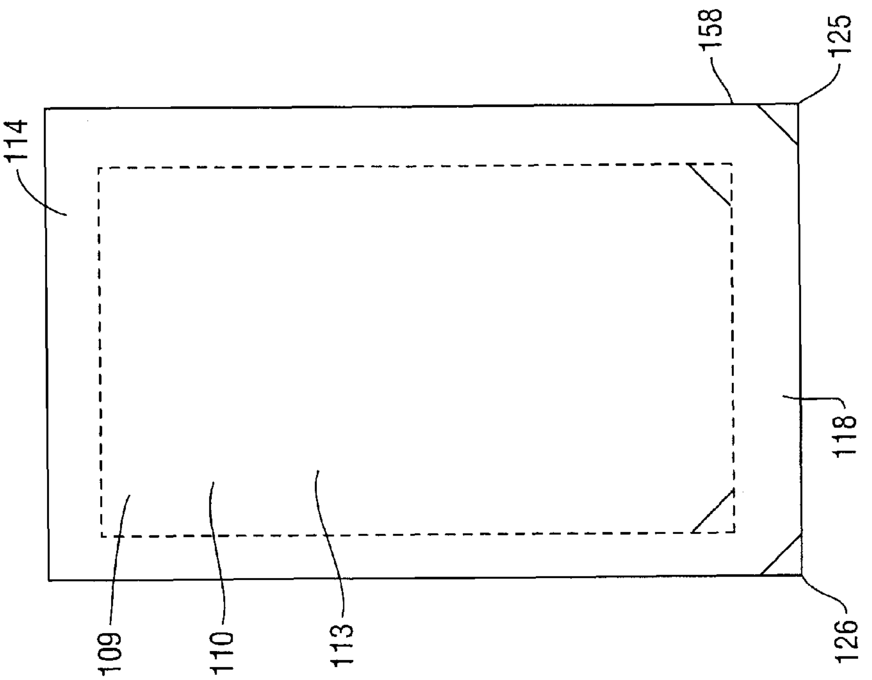
FIG. 3B shows a plan view of the front side (top side) of the label of FIG. 1 after it has been completely removed from the label backing.
Figure 3A:
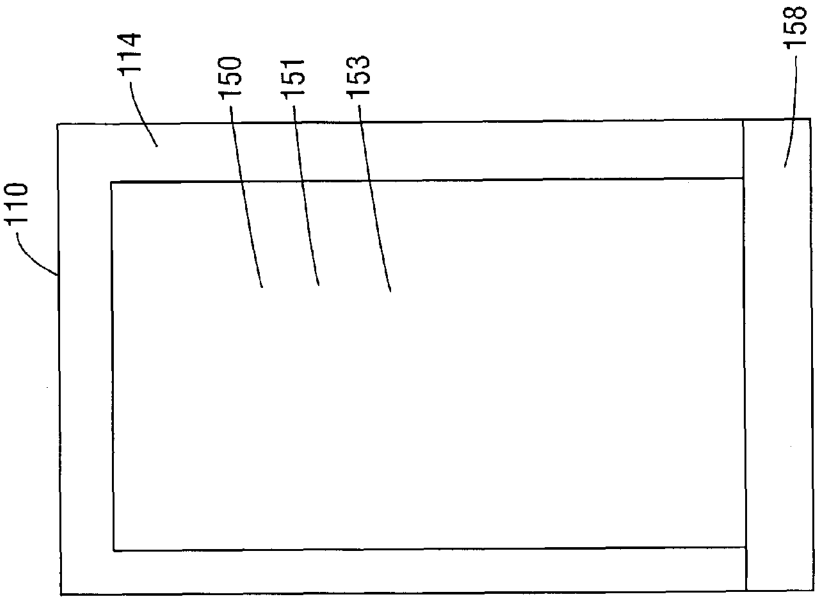
FIG. 3A shows a plan view of the back side (underside) of the label of FIG. 1 after it has been completely removed from the label backing.

FIGS. 3A and 3B respectively show the back and front of label 100 after it has been removed from peripheral portion 154 of lower layer 150. As seen in FIGS. 2B, 3A, and 3B, only the peripheral portion 154 of lower layer 150 is separated from label 100. End portion 158 of lower layer 150 remains attached to label 100. Similarly, central portion 153—which preferably includes text, images, and/or other information printed by the thermal printer—also remains attached to label 100. As noted above, second die cut 155 completely severs the peripheral portion 154 of lower layer 150 from both the central portion 153 and the end portion 158 of lower layer 150. Thus, when pull tabs 121, 122 of label 100 are pulled, only the peripheral portion 154 of lower layer 150 will separate from label 100.

Figure 4B:
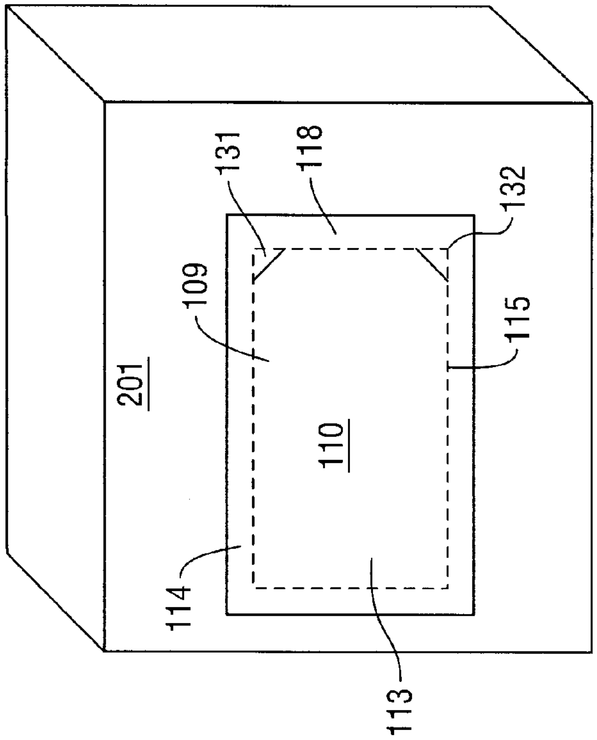
FIG. 4B shows a perspective view of the label and package of FIG. 4A after the pouch has been sealed.
Figure 4A:
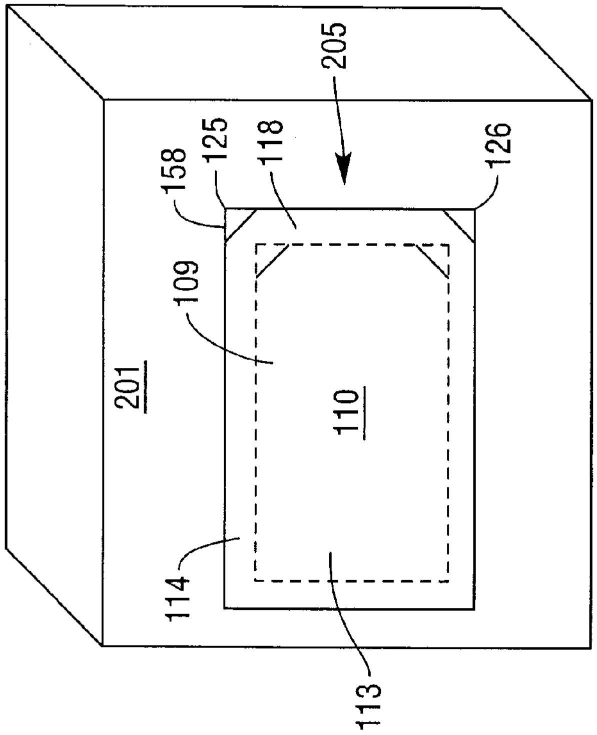
FIG. 4A shows a perspective view of the label of FIGS. 3A and 3B after the label has been affixed to a package and with the sealable pouch remaining open.

FIG. 4A shows how label 100 is attached to a package 201 or other container to create a sealable pouch 205. As shown in FIG. 4A, the label 100 is first affixed to the package 201 such that the exposed adhesive on the underside (i.e., inner face) of peripheral portion 114 (FIG. 3A) of upper layer 110 is brought in contact with the surface of the package 201. Advantageously, the end portion 158 (FIG. 3A) of lower layer 150 remains attached to the label 100 such that no adhesive is exposed to the package along the end portion 118, 158 (FIG. 4A) of label 100. As shown towards the right of FIG. 4A, this creates a pocket or pouch 205 along one edge of the label 100. This pouch 205 can be used to store a piece of paper (either folded or unfolded) or any other suitable insert capable of fitting inside the pouch 205. Such an insert could include a packing slip, a receipt, a return label, a coupon, promotional literature, or any other suitable information. Alternatively, the pouch 205 could be left empty in certain situations.

After inserting a paper or other object into pouch 205 (or deciding to leave pouch 205 empty), the pouch 205 can be closed by peeling the end portion 158 of lower layer 150 away from the end portion 118 of upper layer 110. Optional pull tabs 125, 126 can be used to pull the two end portions 158, 118 apart from one another. This will expose the adhesive contained on the underside (i.e., inner face) of end portion 118 of upper layer 110. End portion 158 of the lower layer 150 can be discarded and end portion 118 of upper layer 110 can be brought into contact with the package 201, thus sealing the pouch 205.

Figure 5:
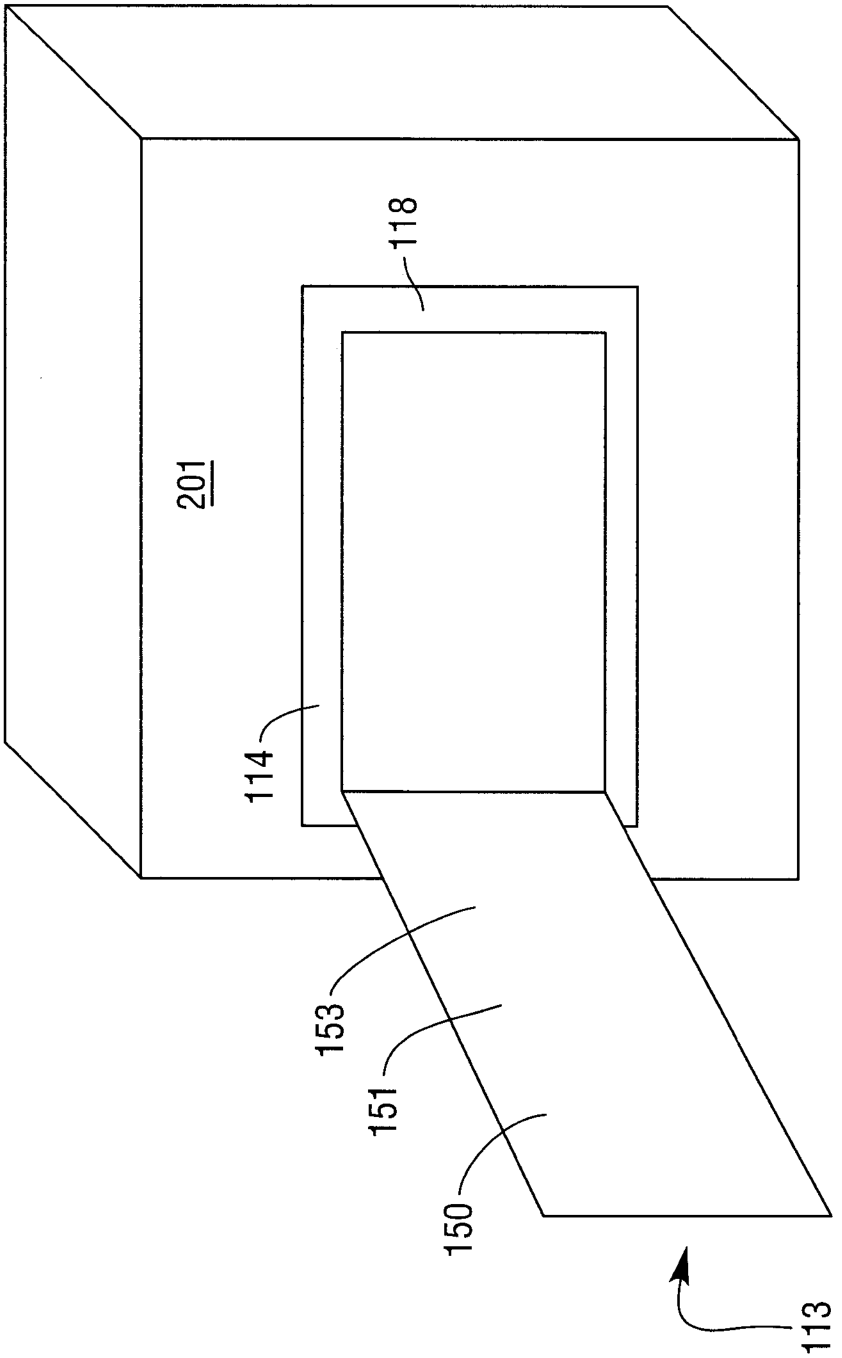
FIG. 5 shows a perspective view of the label and package of FIG. 4B after the pouch has been partially opened.

FIG. 5 shows how the pouch can be opened after it has been sealed. The central portions 113, 153 of upper layer 110 and lower layer 150, respectively, can be removed from the peripheral portion 114 of the label 100 by tearing along perforation lines 115 (FIG. 1). Optional pull tabs 131, 132 (FIG. 1) can help facilitate the removal of the central portions 113, 153 from the package 201. Once the pouch 205 is open, the contents of the pouch 205 can be removed. In addition, any text, images, or other information printed on the outer face 151 of central portion 153 of the label 100 will then be visible.

In some embodiments, the adhesive 330 on the inner face 111 of the central portion 113 of the upper layer 110 will be of a higher tack than the adhesive 330 on the inner face 111 of the peripheral portion 114 of the upper layer 110. This higher tack adhesive will help to prevent central portion 113 of the upper layer 110 from peeling away from central portion 153 of the lower layer 150 when the pouch 205 is opened along perforation lines 115 as shown in FIG. 5.

In some embodiments, the release layer 340 on the inner face 149 of lower layer 150 contains release material (such as silicon) only on the peripheral portion 154 and end portion 158 of lower layer 150. That is, the release material is omitted from the inner face 149 of central portion 153 of the lower layer 150. This facilitates the permanent bonding of the central portion 153 of lower layer 150 to the central portion 113 of upper layer 110.

In some embodiments, the shape of label 100 varies from the rectangular shape shown in FIG. 1. Any shape including, but not limited to, circles, ovals, squares, rhomboids, trapezoids, or other polygons may be used. Irregular shapes may also be used. Such alternate embodiments preferably comprise central portions 113, 153, peripheral portions 114, 154, and end portions 118, 158 on the upper layer 110 and lower layer 150. In addition, the central portions 113, 153 in such embodiments will preferably be substantially congruent to one another, with central portion 153 located below central portion 113 and substantially aligned therewith. Likewise, the peripheral portion 154 and end portion 158 of the lower layer 150 is such embodiments will together preferably be substantially congruent to—and substantially in vertical alignment with—the peripheral portion 114 of upper layer 110.

Use of Label

A preferred use of label 100 is for shipping labels for packages. A person or business organization who desires to mail a package 201 (a "sender") can use a direct thermal printer to print a destination address of a recipient on the outer face 109 of upper layer 110 of label 100. On the outer face 151 of lower layer 150 of label 100, the sender can use the direct thermal printer to print a return address, a packing list/manifest, a receipt, a coupon, promotional literature, or any other suitable information. Such printing could occur in one or more passes through a two-sided direct thermal printer. Alternately, such printing could occur in two or more passes through a single sided direct thermal printer. Suitable printers are described in U.S. Pat. Nos. 7,589,752 and 7,777,770, the contents of which are incorporated herein by reference. In some embodiments, label 100 will have pre-printed text, images, or other information (such as the sender's logo) and the sender will not need to utilize the direct thermal printer to print such information.

In addition to printing information on the front (outer face 109 of upper layer 110) and back (outer face 151 of lower layer 150) of label 100, the sender can print additional information on a separate piece of paper. Such information could include a return address, a packing list/manifest, a receipt, a coupon, promotional literature, or any other information.

Next, the sender would peel label 100 off of the label backing (i.e., peripheral portion 154 of lower layer 150) as shown in FIGS. 2A-2B. As discussed above, optional pull tabs 121, 122 can be used to pull the label 100 off of its backing.

The sender would then affix label 100 to the front of a package 201 for shipping to the recipient as shown in FIG. 4A. Because the end portion 158 of lower layer 150 remains attached to label 100, an opening to pouch 205 is created. The sender then inserts the separate piece of paper described above into pouch 205. The sender may also insert any other suitable object (such as a key, token, or other item) into pouch 205 in addition to, or in lieu of, the separate piece of paper.

Finally, the sender would peel the end portion 158 of lower layer 150 apart from label 100 and discard end portion 158. Optional pull tabs 125, 126 can be used to peel end portion 118 away from end portion 158. The sender would then affix end portion 118 of upper layer 110 to the side of package 201, thus sealing pouch 205, as shown in FIG. 4B. The sender would then mail the package 201 to the recipient.

Upon receipt, the recipient could tear along perforation lines 115 to remove the central portions 113, 153 of label 100 from package 201, as shown in FIG. 5. Optional pull tabs 131, 132 can help facilitate the removal of the central portions 113, 153 of label 100 from package 201.

The central portion 113 of upper layer 110 of label 100 will preferably remain attached to the central portion 153 of lower layer 150 of label 100 when the recipient tears along perforation lines 115. As described above, the adhesive 330 on the inner face 111 of the central portion 113 of upper layer 110 of label 100 may be of a relatively high tack to ensure that the two central portions 113, 153 remain attached to one another when the recipient tears along perforation lines 115. In some embodiments, the recipient may then optionally peel the central portion 153 of lower layer 150 apart from the central portion 113 of upper layer 110. Alternatively, in some embodiments, the release material (such as silicon) may be omitted from the inner face 149 of central portion 153 of the lower layer 150 of label 100, thus permanently bonding central portion 153 to central portion 113.

When the recipient tears along perforation lines 115, the recipient advantageously gains access to the information printed on the outer face 151 of lower layer 150 of label 100 as shown in FIG. 5. The recipient also advantageously gains access to the contents of pouch 205.

Alternate Embodiments

Figure 7:
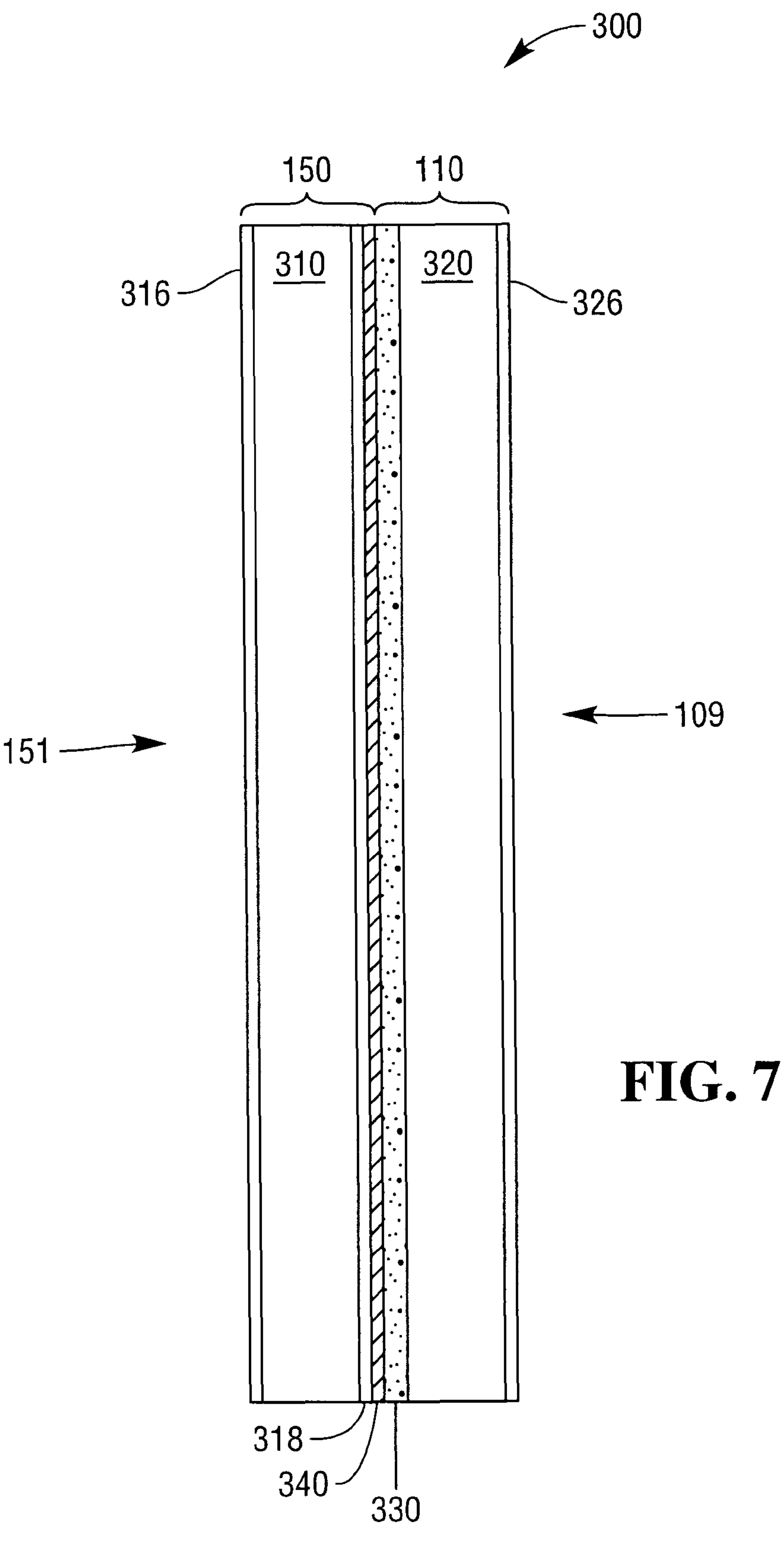
FIG. 7 shows a cross-sectional detailed view of a two-sided direct thermal label in an alternate embodiment.

FIG. 7 shows an alternate embodiment of a label 300 having three thermally printable surfaces, one of which is embedded within the label 300 after it has been printed upon. Label 300 comprises an upper layer 110 and a lower layer 150. Upper layer 110 of label 300 (FIG. 7) is identical to upper layer 110 of label 100 (FIG. 6). Specifically, upper layer 110 of label 300 comprises a substrate 320, adhesive 330, and thermally sensitive coating 326.

Lower layer 150 of label 300 (FIG. 7) is similar to lower layer 150 of label 100 (FIG. 6) with one exception: lower layer 150 of label 300 (FIG. 7) comprises an additional thermally sensitive coating 318 on the inner face 149 of substrate 310. This additional thermally sensitive coating 318 on substrate 310 allows for text, images, or other information to be printed on both sides of lower layer 150. The release layer 340 of lower layer 150 of label 300 preferably contains release material (such as silicon) over the entire inner face 149 of lower layer 150, including central portion 153 of lower layer 150.

When such a label 300 is affixed to a package 201 and sent to a recipient, the recipient can tear along perforation lines 115 to gain access to pouch 205 and also to the printed information on the outer face 151 of the central portion 153 of lower layer 150 of label 300. In addition, the recipient can peel the central portion 153 of lower layer 150 away from the central portion 113 of upper layer 110 to gain access to the printed information on the inner face 149 of lower layer 150.

Additional thermal imaging elements suitable for use in alternate embodiments of the present invention are described in U.S. Pat. Nos. 7,777,770 and RE38,976, the contents of which are incorporated herein by reference.

In some embodiments of the invention, indentations, tear strips, or other features known to those skilled in the art may be used in addition to, or in place of, one or more pull tabs 121, 122, 125, 126, 131, 132.

In some embodiments of the invention, indentations, tear strips, or other features known to those skilled in the art may be used in addition to, or in place of, perforation lines 115 or portions of perforation lines 115.

Accordingly, while the invention has been described with reference to the structures and processes disclosed, it is not confined to the details set forth, but is intended to cover such modifications or changes as may fall within the scope of the following claims.

What is claimed is:

1. A two-sided direct thermal adhesive label adapted for forming a pouch which (i) is defined between the label and a package to be mailed after the label is affixed to the package, (ii) has a pouch opening through which a separate item can be inserted into the pouch to be mailed along with the package, and (iii) is sealable to close the pouch opening after a separate item has been inserted through the opening and placed in the pouch, the label comprising:

a first substrate having an outer face which is at least partially coated with a thermally sensitive material and an inner face which is at least partially coated with an adhesive, wherein the first substrate has disposed therein one or more perforation lines forming (i) a substantially rectangular-shaped central portion of the first substrate, and (ii) a substantially O-shaped peripheral portion of the first substrate; and a second substrate having an outer face which is at least partially coated with a thermally sensitive material and an inner face which is at least partially coated with a release material, wherein the second substrate has disposed therein one or more die cuts forming (i) a substantially rectangular-shaped central portion of the second substrate which is substantially congruent to the rectangular-shaped central portion of the first substrate, (ii) a substantially U-shaped peripheral portion of the second substrate which is substantially aligned with a first portion of the O-shaped peripheral portion of the first substrate, and (iii) a substantially I-shaped end portion of the second substrate which is substantially aligned with a second portion of the O-shaped peripheral portion of the first substrate.

2. The label of claim 1 further comprising:

a first tab for facilitating the first substrate, the rectangular-shaped central portion of the second substrate, and the I-shaped end portion of the second substrate to be peeled away along the one or more die cuts disposed in the second substrate from the U-shaped peripheral portion of the second substrate and thereby to allow the first portion of the O-shaped peripheral portion of the first substrate to be affixed to the package to define at least in part the pouch between the package and the rectangular-shaped central portions of the first and second substrates with the pouch opening defined at least in part at the I-shaped end portion of second substrate.

3. The label of claim 2 further comprising:

a second tab different from the first tab and for facilitating the I-shaped end portion of the second substrate to be peeled away from second portion of the O-shaped peripheral portion of the first substrate after the first portion of the O-shaped peripheral portion of the first substrate has been affixed to the package and thereby to allow the second portion of the O-shaped peripheral portion of the first substrate to be sealed against the package to close the pouch opening.

4. The label of claim 3 further comprising:

a third tab different from the first and second tabs and for facilitating the rectangular-shaped central portions of the first and second substrates to be peeled away along the one or more perforation lines disposed in the first substrate and the one or more die cuts disposed in the second substrate and thereby to gain access to the pouch after the pouch opening has been sealed closed.

5. A two-sided direct thermal adhesive label adapted for forming a pouch which (i) is defined between the label and a package to be mailed after the label is affixed to the package, and (ii) has a pouch opening through which a separate item can be inserted into the pouch to be mailed along with the package, the label comprising:

a first substrate having an outer face and an inner face, wherein (i) the outer face of the first substrate is at least partially coated with a thermally sensitive material, (ii) the inner face of the first substrate is at least partially coated with an adhesive, and (iii) the first substrate has disposed therein one or more perforation lines forming a central portion and a peripheral portion; and a second substrate having an outer face and an inner face which faces the inner face of the first substrate, wherein (i) the outer face of the second substrate is at least partially coated with a thermally sensitive material, (ii) the inner face is at least partially coated with a release material which faces the adhesive coated on the inner face of the first substrate, (iii) the second substrate has disposed therein one or more die cuts forming a central portion which faces the central portion of the first substrate, a peripheral portion which faces a first portion of the peripheral portion of the first substrate, and an end portion which faces a second portion of the peripheral portion of the first substrate, (iv) the central portion of the second substrate is substantially congruent to the central portion of the first substrate and defines at least in part the pouch when the label is affixed to the package to be mailed, and (v) the end portion of the second substrate defines at least in part the pouch opening through which a separate item can inserted and placed in the pouch to be mailed along with the package when the label is affixed to the package.

6. The label of claim 5 wherein the central portion of the first substrate is substantially aligned with the central portion of the second substrate.

7. The label of claim 6 wherein:

the end portion of the second substrate is substantially aligned with the second portion of the peripheral portion of the first substrate; and the peripheral portion of the second substrate is substantially aligned with the first portion of the peripheral portion of the first substrate.

8. The label of claim 7 wherein:

the inner face of the peripheral portion of the first substrate is substantially coated with an adhesive;

the inner face of the peripheral portion of the second substrate is substantially coated with a release material; and the inner face of the end portion of the second substrate is substantially coated with a release material.

9. The label of claim 5 wherein the peripheral portion of the first substrate extends around the entire periphery of the label.

10. The label of claim 5 wherein the end portion of the second substrate is substantially aligned with the second portion of the peripheral portion of the first substrate.

11. The label of claim 5 wherein the thermally sensitive material coatings of first and second substrates comprise one or more substances adapted to darken or change color when the first and second substrates are heated.

12. The label of claim 5 wherein the outer face of the peripheral portion of the first substrate comprises at least one pull tab.

13. The label of claim 5 wherein the outer face of the central portion of the first substrate comprises at least one pull tab.

14. The label of claim 5 wherein the adhesive on the inner face of the central portion of the first substrate is of a higher tack than the adhesive on the inner face of the peripheral portion of the first substrate.

15. The label of claim 5 wherein the inner face of the central portion of the second substrate is substantially free of release material.

16. The label of claim 15 wherein the inner face of the central portion of the first substrate is coated with adhesive.

17. The label of claim 5 wherein the inner face of the second substrate is at least partially coated with a thermally sensitive material.

18. A two-sided direct thermal adhesive label adapted for forming a pouch which (i) is defined between the label and a package to be mailed after the label is affixed to the package, (ii) has a pouch opening through which a separate item can be inserted into the pouch to be mailed along with the package, and (iii) is sealable to close the pouch opening after a separate item has been inserted through the opening and placed in the pouch, the label comprising:

a first substrate having an outer face which is at least partially coated with a thermally sensitive material and an inner face which is at least partially coated with an adhesive, wherein the first substrate has disposed therein one or more perforation lines forming (i) a central portion of the first substrate, and (ii) a peripheral portion of the first substrate;

a second substrate having an outer face which is at least partially coated with a thermally sensitive material and an inner face which is at least partially coated with a release material, wherein the second substrate has disposed therein one or more die cuts forming (i) a central portion of the second substrate which is substantially congruent to the central portion of the first substrate, (ii) a peripheral portion of the second substrate which is substantially aligned with a first portion of the peripheral portion of the first substrate, and (iii) an end portion of the second substrate which is substantially aligned with a second portion of the peripheral portion of the first substrate;

a first tab for facilitating the first substrate, the central portion of the second substrate, and the end portion of the second substrate to be peeled away along the one or more die cuts disposed in the second substrate from the peripheral portion of the second substrate and thereby to allow the first portion of the peripheral portion of the first substrate to be affixed to the package to define at least in part the pouch between the package and the central portions of the first and second substrates with the pouch opening defined at least in part at the end portion of the second substrate; and a second tab different from the first tab and for facilitating the end portion of the second substrate to be peeled away from the second portion of the peripheral portion of the first substrate after the first portion of the peripheral portion of the first substrate has been affixed to the package and thereby to allow the second portion of the peripheral portion of the first substrate to be sealed against the package to close the pouch opening.

19. The label of claim 18 further comprising:

a third tab different from the first and second tabs and for facilitating the central portions of the first and second substrates to be peeled away along the one or more perforation lines disposed in the first substrate and the one or more die cuts disposed in the second substrate and thereby to gain access to the pouch after the pouch opening has been sealed closed.

* * * * *